Aug. 30, 1932. A. H. PFUND 1,875,133

PAINT TESTING INSTRUMENT

Filed Aug. 24, 1929

Patented Aug. 30, 1932

1,875,133

UNITED STATES PATENT OFFICE

AUGUST HERMAN PFUND, OF BALTIMORE, MARYLAND

PAINT TESTING INSTRUMENT

Application filed August 24, 1929. Serial No. 388,066.

In estimating the cost of painting large structures and various surfaces of considerable area, it is of great importance to be able to compute with accuracy the least amount of the particular kind of paint specified which will be required to produce a predetermined result in the way of covering or hiding the surface to be painted. An instrument for this purpose has been devised and used commercially. It consists of a black plate used as a base plate and having a transverse groove deep enough to contain a thickness of paint sufficient to hide completely any underlying surface without regard to color. Such a thickness is in effect the equivalent of a coat of paint of infinite thickness. This phrase "infinite thickness" will be used herein to designate a thickness of paint sufficient to hide completely any surface of any color.

The instrument also includes a plate supported on the first plate, which is partially or wholly transparent as in applicant's previous Patent No. 1,468,075, in a position in which it is inclined at an acute angle to the base plate. This second plate is mounted to slide on the base plate relatively to the groove. One edge or a portion of an edge of the inclined plate rests on the black plate, the opposite edge being supported a slight distance above it.

In the paint testing operation a small quantity of the paint to be tested is placed on the base plate filling and overflowing the groove. The inclined plate is then placed on the black plate covering the paint which is thus confined in a wedge shaped cavity between the two plates. By sliding the inclined plate with the wedge shaped volume of paint beneath it back and forth, it is found that in some positions the edge of the groove will be apparent and in other positions it will disappear. In other words, the edge of the groove disappears as the thick end of the wedge approaches and appears as the thin end is brought toward it. The exact point at which the paint covers and conceals the edge of the groove adjacent the small end of the wedge may be found by determining the point where this edge appears and the point at which it disappears, taking as the actual point of disappearance a point halfway between the two.

Now, if an indicating point be assumed on the sliding plate, a scale may be inscribed on the base plate which reads in terms of square feet per gallon, to be covered by the particular paint tested, and to a sufficient degree to meet the requirements which ordinarily call for complete hiding.

This test is known as the absolute test. (See Patent 1,468,075.) Another method of testing is based on the determination of the thickness of paint required to conceal the line of demarcation between a white surface having the highest coefficient of diffuse reflection and a black surface having the lowest corresponding coefficient obtainable. A covering of paint sufficient for this purpose will hide any surface completely. This test will be referred to herein as the practical test.

The present invention relates to an improved testing instrument adapted to determine accurately and immediately the thickness of paint required to conceal the line of demarcation between black and white surfaces and to compute the same in units of area per gallon, and to determine in connection with the same sample the amount of paint required to hide completely a black surface and the amount required to likewise cover a white surface. That the instrument be adapted to perform all three tests in connection with a single sample is of great advantage as there is a wide variation in hiding power between the various pigments so that a coating of paint of a given thickness which will meet the test by one of these standards will not necessarily serve the purpose in hand, and by employing all these tests in connection with any sample, absolutely reliable data which cannot be had in any other manner is obtained.

The improved apparatus also includes means for confining the soft paint being tested to the central testing area of the instrument, preventing its escape in a lateral direction, which would permit it to come in contact with the scales, the operator's hand and surrounding objects.

In the accompanying drawing, I have illustrated a paint testing instrument, embodying the features of my invention in the preferred form.

Figure 1:
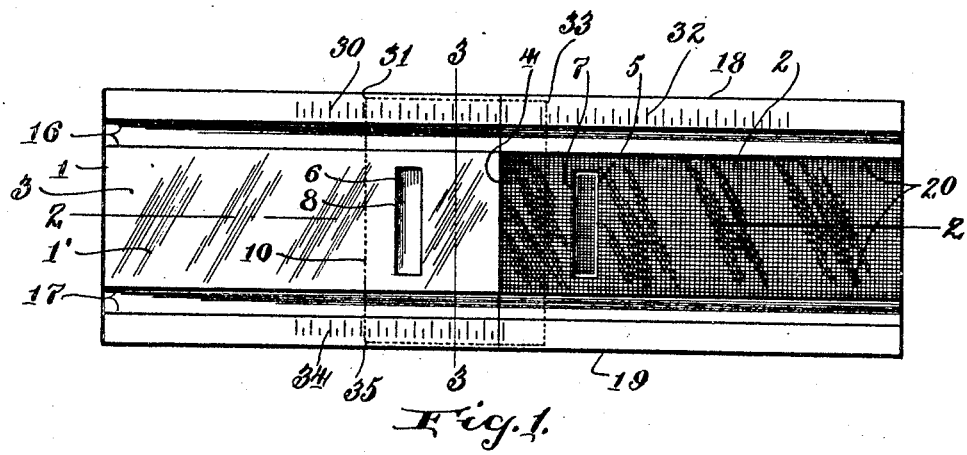
Figure 1 is a top plan view of the instrument with the sliding cover plate removed.
Figure 2:
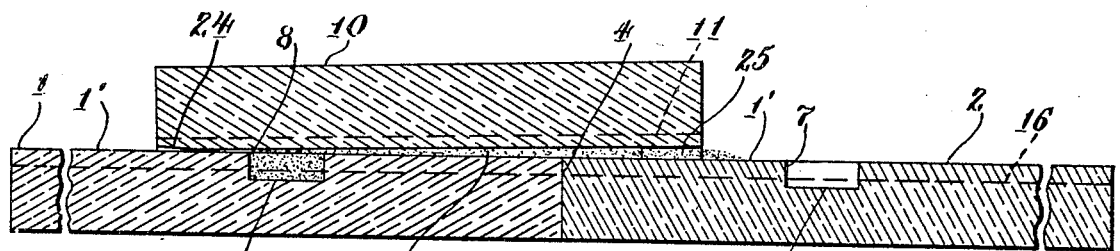
Figure 2 is a longitudinal section of the same taken on the line 2—2, Figure 1, showing the cover plate in operative position.
Figure 3:
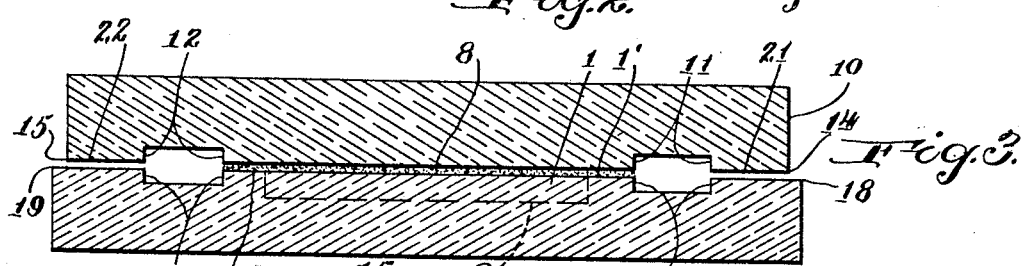
Figure 3 is a transverse section on the line 3—3 of Figure 1, taken through the sliding cover plate.
Figure 4:
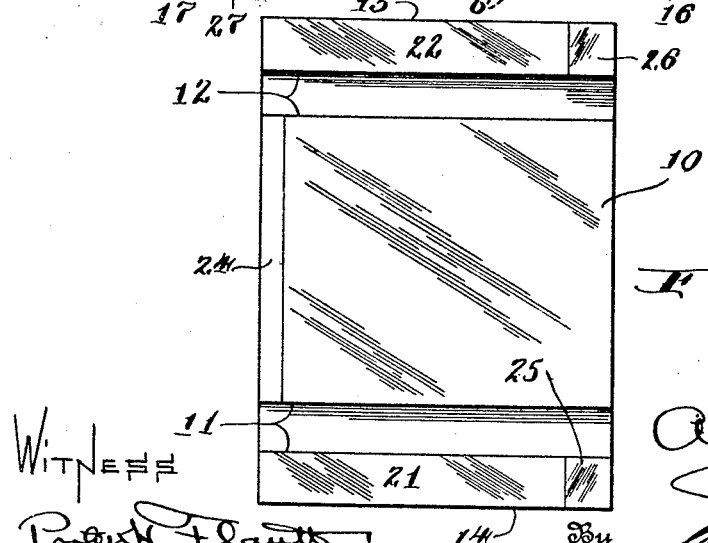
Figure 4 is a plan view of the sliding cover plate removed and inverted.

Referring to the drawing by numerals, each of which is used to indicate the same or similar parts in the different figures, the paint testing instrument in the preferred form shown comprises a glass plate 1, which is preferably of elongated rectangular form. In the preferred form this plate consists of a black area 2 and a white area 3. The white area is of the highest obtainable coefficient of diffuse reflection usually designated in the art as 85 to 90 per cent. and the black area 2 is of the lowest possible coefficient of diffuse reflection. These two areas meet on a transverse line of demarcation 4, which is preferably near the longitudinal center of the plate 1. To give the best results, this line of demarcation should be of extreme fineness. The desired conditions are most satisfactorily brought about by the use of black and white glass, and to obtain the sharpest contrast the black and white areas meet on the line of demarcation without any intervening area of other color or material and conform as nearly as possible to the requirements above stated. To obtain the finest line of demarcation, the contacting edges are ground and fused. While cement may be used for this purpose in the construction of the instrument, it does not give as sharp a line of demarcation and hence as satisfactory results as can be obtained by the preferred construction.

In order that additional tests in the nature of what is known as absolute tests of the hiding power of paints, both when applied to white and to black surfaces, may be performed with this instrument, both the dark area 2 and the white area 3 are recessed or otherwise constructed to provide small transverse depressed areas or recesses 5 and 6, on each side of the line of demarcation 4 and within the respective dark and light areas 2 and 3. These depressions or recesses are of sufficient depth so that when filled with paint, the paint contained therein may be regarded as an infinitely thick layer of paint in that it is sufficient to hide any surface of any color or contrasting colors on which it may be placed. The object of these recesses or depressions is to provide for the comparison of the hiding power in connection with black and white surfaces, respectively, of layers of paint of varied and definite thicknesses with a layer of infinite thickness, thus determining the exact thickness required to give complete hiding of the painted surface. To this end it is desirable that the transverse recesses be formed with an edge or wall at 7 and 8, respectively, giving a line of demarcation between the recess and the plane surface 1' on the side toward the low end of plate 10, i. e., toward the small end of the wedge. These lines 7, 8 define the meeting of the full depth of the recess corresponding to an infinitely thick layer of paint with the surface 1' of the plate 1. This line is preferably straight and at right angles to the length of the plate 1.

The instrument further includes as a moving and indicating element a cover plate 10 which is slightly inclined to the substantially horizontal plane of the plate surface 1' upwardly therefrom and in the direction of the length of the plate 1. This sliding cover plate 10 in the preferred form is shown as provided with grooves 11 and 12 on its bottom surface, next to plate 1 and extending along the plate near each lateral edge 14 and 15, parallel to the length of the plate 1 when the cover plate is in its operative position thereon. These grooves are also parallel to each other and to the direction of the incline. The main plate or base plate is also provided with such longitudinal grooves 16 and 17, spaced slightly inwardly from each longitudinal edge 18 and 19, the spacing of these grooves being equal to the spacing of the grooves 11 and 12, so that in the operative relation of the plates the grooves 11—12 and 16—17 register with each other. These grooves are not absolutely essential to the operation of the instrument, but they contribute to its effectiveness of operation in that they tend to confine the soft paint being tested which is placed in the central longitudinal extending area 20 of the base plate 1 between the grooves 16 and 17 and to keep it off the gauger.

In the operation of the instrument a small quantity of paint, usually somewhat less than a teaspoonful, is placed on the base plate 1 near the center. The sliding measuring plate 10 is then placed on the base plate covering the paint.

During this operation the sliding measuring plate 10 is supported at one end on the end edges of the edge portions 21 and 22 outside the grooves 11 and 12, the end edge 24 between the said grooves being slightly flattened by grinding so that this portion of the edge remains slightly out of contact with the base plate eliminating the necessity for scraping the paint entirely free from the glass as the sliding cover plate is moved back and forth in the measuring operation. This arrangement by avoiding the necessity for scraping the glass free of paint, contributes to the ease with which the sliding plate is moved in the measuring operation.

The forward or upper end of the sliding measuring plate may be supported in any suitable manner to give the desired incline. In the preferred form of the invention shown this portion of the glass is supported by extremely thin blocks of non corrosive metal 25 and 26, cemented to each forward lower corner of the plate, i. e., to the corners opposite the edge 24.

To perform the practical test, the sliding plate 10 with the wedge of soft paint 27 between the base plate 1 and the sliding plate 10, is moved back and forth relatively to the line of demarcation 4, the points at which this line appears and disappears being noted on any suitable scale 30, any suitable indicating point on the sliding plate 10 as the rear corner 31, being used to cooperate with the scale 30 for this purpose, it being understood that this scale 30 may be calibrated in square feet per gallon or any other convenient unit. It is, of course, located in accordance with the position of the indicating point 31 on the plate 10.

To determine the hiding power of any particular paint in connection with black paint, the plate 10 carrying beneath it the wedge of soft paint 27 to be tested is moved back and forth relatively to the recess 5 contained in the black area until the line 7 indicating the wall of said recess toward the low end of plate 10 disappears and reappears, said points being noted on the scale 32 at the side. For this purpose any suitable indicating point, as the corner 33 of the plate, may be used. In this reading as in all other readings, the point of appearance and disappearance of the line or wall 7 are both noted and the scale is read at the intermediate point halfway between. This gives the most accurate result obtainable. The scale, as in the previous instance, may be graduated in units of square feet per gallon or in any other desired unit.

To determine the hiding power of the same or any paint relatively to a white background, the sliding cover plate 10, carrying the wedge 27 of paint to be tested, is moved back and forth relatively to the recess 6 in the white area until the line or side wall 8 of the groove nearest the small end of the wedge disappears and reappears, both points being noted on the scale 34 in connection with which a suitable indicating point as the corner 35 is used, the scale being located accordingly. The intermediate point on the scale between said points of appearance and disappearance is selected as the correct reading, it being understood that this scale, like the others, may be graduated in terms of square feet per gallon to be covered by paint to produce a specified result.

I have thus described specifically and in detail an apparatus embodying my invention in the preferred form in order that the construction and manner of operation of the same may be clearly understood. However, the specific terms herein are used descriptively rather than in a limiting sense, the scope of the invention being defined in the claims.

What I claim as new and desire to secure by Letters Patent is:

1. In an instrument for testing the hiding power of a pigment or paint, a member having a plane surface presenting areas of contrasting color meeting on a line of demarcation and a transparent plate resting thereon at one end and slightly inclined thereto and means for holding said plate in inclined position in relation to said member whereby it is permitted to slide along the said plane surface so that the paint to be tested placed on said surface forms a wedge shaped body between said plate and said surface, which wedge of paint may be moved along the said plane surface with said sliding plate, to locate the exact point at which the line of demarcation disappears, whereby the thickness of a coat of the paint being tested necessary to hide completely said line of demarcation is determined.

2. In an instrument for testing the hiding power of a pigment or paint, a member having a plane surface presenting areas of sharply contrasting color meeting on a line of demarcation and a transparent plate inclined thereto at an acute angle and adapted to slide along said surface so that the paint to be tested forms a wedge shaped body between said plate and said surface which wedge may be moved along the first mentioned plate with said sliding plate to locate the exact point at which the line of demarcation disappears, and a scale for reading the position of the sliding plate in terms of quantity of paint per unit of area.

3. In a paint testing instrument a testing plate having testing means, a transparent sliding plate mounted thereon and inclined thereto, the respective plates having registering grooves on their opposed surfaces and parallel to the direction of motion of the sliding plate, the grooves being spaced apart to permit the paint to be tested to be placed between the grooves which tend to prevent its escape from the testing area.

4. In a paint testing instrument a testing plate having differently colored areas and recesses within each said area providing for the thickness of paint in said recesses, said recesses having each an edge forming a testing line where it meets the surface of the plate, a transparent sliding plate mounted on said testing plate and inclined thereto whereby a sample of paint to be tested is confined between the testing plate and the sliding plate forming a wedge of paint which may be moved along the testing plate to locate the point of disappearance of said lines at the edges of the respective recesses providing for testing the hiding power of the paint in connection with the colors of the various contrasting areas of the plate.

5. In a paint testing instrument a testing plate having differently colored areas and a recess within said area providing for an essentially infinite thickness of paint in said recess, said recess having an edge forming a testing line where it meets the surface within the colored areas of the plate, a transparent sliding plate mounted on said testing plate and inclined thereto whereby a sample of paint to be tested is confined between the testing plate and the sliding plate forming a wedge of paint which may be moved along the testing plate to locate the point of disappearance of said lines at the edges of the recess providing for testing the hiding power of the paint in connection with the colors of the plate containing the recess, the differently colored areas meeting and forming a line of demarcation between said areas which also serves as a test line.

Signed by me at Baltimore, Maryland, this 22nd day of August, 1929.

AUGUST HERMAN PFUND.